United States Patent [19]

Dörffel et al.

[11] Patent Number: 4,542,194

[45] Date of Patent: Sep. 17, 1985

[54] NAPHTHA-SOLUBLE, HYDROGENATED ALKYL ARYL KETONE/FORMALDEHYDE RESINS AND PROCESS FOR THEIR PRODUCTION

[75] Inventors: Jörg Dörffel; Erhard Lange; Werner Otte; Friedrich Heinrich, all of Marl, Fed. Rep. of Germany

[73] Assignee: Chemische Werke Huels, A.G., Marl, Fed. Rep. of Germany

[21] Appl. No.: 550,461

[22] Filed: Nov. 10, 1983

[30] Foreign Application Priority Data

Nov. 11, 1982 [DE] Fed. Rep. of Germany ....... 3241735
Sep. 24, 1983 [DE] Fed. Rep. of Germany ....... 3334631

[51] Int. Cl.$^4$ ................................................ C08G 2/30
[52] U.S. Cl. ..................................... 525/521; 528/227
[58] Field of Search ......................... 525/521; 528/227

[56] References Cited

U.S. PATENT DOCUMENTS 2,380,142  7/1945  Ballard et al. ...................... 525/521
2,600,764  6/1952  Harvey .............................. 528/227

Primary Examiner—Harold D. Anderson
Attorney, Agent, or Firm—Millen & White

[57] ABSTRACT

A naphtha-soluble, hydrogenated $C_{1-4}$-alkyl $C_{6-10}$-aryl ketone/formaldehyde resin, having an oxygen content of at least 6% by weight and a softening point of at least 70° C. can be produced by a process comprising the step of hydrogenating a $C_{1-4}$-alkyl $C_{6-10}$-aryl ketone/formaldehyde resin under a hydrogen pressure of at least 200 bar and a temperature of 140°–300° C., in the presence of a nickel, palladium, palladium/copper or palladium/nickel catalyst. These resins are useful, for example, as additives to improve the hardness of varnishes and other coatings.

8 Claims, No Drawings

NAPHTHA-SOLUBLE, HYDROGENATED ALKYL ARYL KETONE/FORMALDEHYDE RESINS AND PROCESS FOR THEIR PRODUCTION

BACKGROUND OF THE INVENTION

The present invention relates to naptha-soluble, hydrogenated alkyl aryl ketone/formaldehyde resins, as well as to the manufacture thereof.

Alkyl aryl ketone/formaldehyde resins have been known industrially for a very long time. The disadvantages inherent in these resins can, in part, be compensated for by a hydrogenating treatment.

Such a process is described in German Pat. No. 870,022. This reference teaches that the starting resins can be hydrogenated to varying extents, depending on the selection of the reaction conditions. The resins showed marked differences in their properties depending upon the degree of hydrogenation, as measured by the oxygen content still present in the resultant products.

With a drop in oxygen content, a reduction of the softening point was also observed—down to a softening point of about 50° C. with an oxygen content of about 4% by weight (starting resin: acetophenone/formaldehyde resin—softening point: 68° C., oxygen content: about 13% by weight). An advantage of the prior art hydrogenated resins with a low oxygen content was their excellent solubility in naphtha, which is very frequently utilized as a solvent in the paint industry. The starting resins and also their hydrogenation products of a higher oxygen content were, however, practically insoluble in aliphatic hydrocarbons.

Although such hydrogenated resins were very readily soluble in naphtha, a marked disadvantage was their low softening point, which rendered them poorly suitable for practical applications.

Thus, the prior art teaches that progressive hydrogenation, and concomitant lowered oxygen content, of the starting resins, increases their naphtha solubility to the desired extent, but simultaneously lowers their softening point to such a degree that the resultant hydrogenated resins are in many cases unsuitable for commercial applications.

OBJECTS OF THE INVENTION

One object of the present invention is to provide a hydrogenated alkyl aryl ketone/formaldehyde resin which, while retaining its good solubility in naphtha, also exhibits a sufficiently high softening point to meet commercial requirements.

Another object of the invention is to provide a process for preparing the foregoing resin which can be adapted for continuous operation if desired.

Upon further study of the specification and appended claims, further objects and advantages of this invention will become apparent to those skilled in the art.

SUMMARY OF THE INVENTION

These and other objects of the invention can be attained by providing a naphtha-soluble hydrogenated $C_{1-4}$-alkyl $C_{6-10}$-aryl ketone/formaldehyde resin, having an oxygen content of at least 6% by weight and a softening point of at least 70° C.

In a process aspect, the invention provides a process for producing the foregoing resin, comprising the step of hydrogenating a $C_{1-4}$-alkyl $C_{6-10}$-aryl ketone/formaldehyde resin under a hydrogen pressure of at least 200 bar and a temperature of 140°–300° C., in the presence of a nickel, palladium, palladium/copper or palladium/nickel catalyst.

DETAILED DISCLOSURE

It is now possible, by virtue of the present invention, to modify alkyl aryl ketone/formaldehyde resins by hydrogenation to such an extent that they exhibit the high solubility in naphtha shown by prior art hydrogenated resins without, however, showing a substantial drop in softening point. The resins of this invention have softening points of about the same order of magnitude as the starting resins or even higher than the starting resins.

The alkyl aryl ketone component of the resin which is hydrogenated in the present process has an alkyl group of 1–4, preferably 1–2, carbon atoms as one substituent on the ketone carbonyl, and an aryl group of 6–10, preferably 6, carbon atoms as the other substituent.

The hydrogenated resin according to the invention has an oxygen content of at least 6% by weight, preferably 7–9.5% by weight, and a softening point of at least 70° C., preferably 75°–135° C., and more preferably a softening point of 85°–125° C. The use of the resins with the higher softening point as additive in varnishes is advantageous for practical applications because the coatings become harder and in the case of air drying alkyd systems the dust drying time is shortened.

The process of the invention comprises hydrogenating an alkyl aryl ketone/formaldehyde resin under a hydrogen pressure of at least 200 bar, preferably 250–350 bar, and at a temperature of 140°–300° C., in the presence of a nickel, palladium, palladium/copper or palladium/nickel catalyst.

The reaction temperature, with the use of nickel catalysts, is 140°–200° C., preferably 150°–180° C. When using catalysts based on palladium, the reaction temperature is 180°–300° C., preferably 200°–250° C.

Suitable nickel catalysts, some of which are available commercially, contain at least 30% by weight, preferably at least 50% by weight, and especially at least 65% by weight of nickel (calculated as the metal). In addition, other metals can be present in the catalysts, in the form of their oxides, such as, for example, Cu, Cr, Fe, Mg, Ca, etc. The latter are contained in the catalyst in amounts of up to 3% by weight, preferably up to 1% by weight (calculated as the metal). The catalyst can be supported on, e.g., $Al_2O_3$, $SiO_2$ and the like, individually or as a mixture thereof.

When palladium is used as the catalyst, the latter contains 0.1–10% by weight of palladium (calculated as the metal). Suitable support materials include, e.g., aluminum oxide, activated carbon, kieselguhr, or aluminum silicates. Preferably used catalysts are those containing palladium in a concentration of 0.1–1% by weight on the surface of an aluminum oxide—preferably in the γ- or η-modification. The specific surface area of the catalyst is preferably 50–500 m²/g, especially 150–250 m²/g. Besides aluminum oxide, activated carbon is especially suitable as the support material for a discontinuous mode of operation. In this case, the catalyst contains 1–10% by weight of palladium. Several such palladium catalysts are available commercially.

Another mode of operation according to this invention starts with palladium catalysts in conjunction with the above-described nickel catalysts or copper catalysts, respectively, as the additional cocatalysts, wherein the latter can be activated with chromium or chromium/nickel.

It is thereby possible to obtain products according to this invention within shorter time periods in discontinuous (batchwise) operation or with higher throughputs in continuous hydrogenation in a fixed-bed reactor. In continuous operation, it is recommended to layer the catalysts, or to use two differently charged hydrogenation reactors in series, wherein hydrogenation takes place advantageously first on the palladium catalyst and then on the second catalyst, preferably an activated copper catalyst. The volume ratio of palladium catalyst to nickel or copper catalyst is from about 1:0.05 to 1:0.3.

Suitable starting resins for hydrogenation include, e.g., condensation products of: (1) acetophenone, methyl naphthyl ketone, acetylethylbenzene, as well as alkyl phenyl ketones having a longer alkyl residue, e.g., propiophenone or butyrophenone, or alkyl aryl residue, e.g., acetyltetrahydronaphthalene and/or mixtures thereof; and (2) formaldehyde or compounds decomposable to generate formaldehyde, e.g., paraformaldehyde.

Suitable resins include those which can be produced as described in German Pat. No. 892,975, preferably by condensation of the alkyl aryl ketones with approximately equivalent quantities of formaldehyde, in the presence of relatively large amounts of alkali. Also suitable are resins obtained by the use of lower amounts of formaldehyde. Such products are disclosed, e.g., in German Pat. No. 897,484. Especially preferred are the acetophenone formaldehyde resins disclosed in German Pat. No. 892,975 and DOS No. 3,324 287 corresponding to U.S. Ser. No. 628,537, filed July 6, 1984. Also, the partially hydrogenated, ethanol-soluble resins, practically unchanged in their oxygen content, described in German Pat. No. 870,022 can be utilized as the starting materials in the present process. The entire disclosures of the foregoing German Patents and DOS are incorporated herein by reference.

The hydrogenation according to the invention is preferably conducted in the presence of a solvent such as an alcohol, e.g., butanol or isobutanol, or an ether, e.g., tetrahydrofuran, dioxane, or an alkyl ether of ethylene glycol or diethylene glycol. The solvent should advantageously be chosen so that the starting material as well as the end product is soluble therein. It is also possible to conduct the process without a solvent, in the melt. Due to easier handling and a more uniform product quality, continuous hydrogenation in the presence of solvents is preferred.

The hydrogenation conditions are critical for the production of the resins of this invention. If the hydrogen pressure is selected to be too low, resins are obtained having softening points that are too low. Analogous relationships exist with respect to the reaction temperature. At a temperature that is too high, the softening point drops to undesirably low values, especially when using nickel catalysts. If the temperature is chosen to be too low, the resins of this invention are obtained only after a prolonged period of time which is impractical from an economic standpoint.

The resins of this invention are colorless, light-stable, heat-stable, and weatherable. On account of their good compatibility, they can be added to air-drying paint varnishes and automobile touch-up enamels to improve hardness, gloss, and adhesion in addition to or instead of other conventional resin additives. It is also possible to add them to coating compositions based on saturated polyesters, to improve gloss and adhesion.

The solubility of the hydrogenated resin of the invention is advantageously at least about 50 g/l, preferably 300 g/l and especially 600 g/l in n-hexane.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The softening points indicated in the examples were determined according to the melting point capillary method (heating rate: 2° C./minute). The softening point is intended to mean the temperature at which a pulverized specimen coalesces by sintering and becomes transparent.

EXAMPLE 1

In an autoclave, 165 g of an acetophenone/formaldehyde resin—prepared according to Example 2 of German Pat. No. 892,975 (softening point: 68° C.; oxygen content: 12.8% by weight)—was subjected to hydrogenation in the presence of 385 g of isobutanol and 16.5 g of a commercially available nickel catalyst (Harshaw Ni 5124) (80.5% by weight of NiO, 9.1% by weight of $SiO_2$, 0.6% by weight of CaO, 0.7% by weight of MgO, 0.5% by weight of $Cr_3O_4$, 0.3% by weight of $Fe_2O_3$, and 7.5% by weight of $Al_2O_3$, annealing loss 0.8% by weight) under a hydrogen pressure of 300 bar and at a temperature of 150° C. for 2 hours, thus absorbing 102 liters of hydrogen (based on 0° C. and 1 bar). After removal of the solvent under vacuum at 175° C., a water-clear, brittle resin was obtained having a softening point of 86° C. (oxygen content: 7.6% by weight). The resin was perfectly soluble in n-hexane, in mineral spirits (boiling range: 145°–200° C.; 17% by volume of aromatic constituents) and in petroleum ether (boiling range: 60°–95° C.; 0.8% by volume of aromatic constituents). The resin was insoluble in ethanol.

EXAMPLE 2

550 g of a 30% solution of a commercially available, ethanol-soluble hydrogenated acetophenone/formaldehyde resi (softening point: 113° C.; oxygen content: 12.2% by weight) (synthetic resin SK) in isobutanol was hydrogenated in a steel autoclave under a hydrogen pressure of 300 bar and at a temperature of 175° C. in the presence of 16.5 g of Raney nickel for 8 hours, thus absorbing in total 96 liters of hydrogen (based on 0° C. and 1 bar). After removing the isobutanol entirely, a water-clear resin was obtained having a softening point of 81° C. and an oxygen content of 6.6% by weight. The product was soluble in ethanol as well as in n-hexane, mineral spirits, and petroleum ether.

EXAMPLE 3

An acetophenone/formaldehyde resin solution (corresponding to Example 1) was continuously hydrogenated in a 2.3-liter fixed-bed hydrogenator, filled with the Ni catalyst disclosed in Example 1, over a time period of 2 months at a temperature of 180° C., under a hydrogen pressure of 300 bar, and with a space velocity of 0.4–0.5 liter of resin solution per liter of catalyst .

hour. The test was intentionally terminated after 2 months without being able to determine any marked reduction in catalyst activity. The thus-obtained products had an oxygen content of 7.3% by weight and a softening point of 88° C. They were perfectly soluble in ethanol, n-hexane, mineral spirits, and petroleum ether.

COMPARATIVE EXAMPLE A

In accordance with Example 2 of German Pat. No. 870,022, a 50% solution of a hydrogenated acetophenone/formaldehyde resin (softening point: 68° C.; oxygen content: 12.8% by weight) was hydrogenated in butanol in the presence of 10% Raney nickel (based on the resin) under a hydrogen pressure of 120 bar and at a temperature of 180° C. in a steel autoclave. The test was terminated at a hydrogen absorption of 50 1/100 g acetophenone resin (based on 0° C. and 1 bar). The resultant product, which was perfectly soluble in n-hexane, mineral spirits, and petroleum ether, had an oxygen content of only 4.2% by weight and a softening point of 48° C.

EXAMPLE 4

Under a hydrogen pressure of 300 bar and at a temperature of 200° C., 165 g of the acetophenone/formaldehyde resin used in Example 1 was hydrogenated in an autoclave in the presence of 385 g of isobutanol and 50 g of a commercially available Pd catalyst (0.5% Pd on for $Al_2O_3$) for 4 hours; during this step, 124 l of hydrogen was absorbed (based on 0° C. and 1 bar). After removal of the solvent (under vacuum at 175° C.), a water-clear, brittle resin was obtained having a softening point of 93° C. (oxygen content: 8.8% by weight) and being perfectly soluble in n-hexane, mineral spirits, petroleum ether, and ethanol.

EXAMPLE 5

In a 400 ml fixed-bed hydrogenator filled with a catalyst layer of 350 ml of the Pd catalyst used in Example 4 and 50 ml of a likewise commercially available Cu/Cr catalyst (33% CuO, 37% $Cr_2O_3$, 8-10% CaO, 8.5-10% $SiO_2$), a 30% by weight solution of the acetophenone/formaldehyde resin disclosed in Example 1 in tetrahydrofuran was hydrogenated continuously at a temperature of 220° C. and under a hydrogen pressure of 300 bar with a space velocity of 0.4 l of resin solution per 1 of catalyst .h. During this procedure, the resin solution first passed over the Pd catalyst and then over the Cu/Cr catalyst. The experiment was intentionally terminated after 14 days without observing any appreciable reduction in catalyst activity. The resultant product had an oxygen content of 8.6% by weight and a softening point of 95° C. The resin was perfectly soluble in ethanol, n-hexane, mineral spirits, and petroleum ether.

EXAMPLE 6

In an autoclave, 165 g of an acetophenone resin (softening point: 99° C., oxygen content: 12.55% by weight) prepared according to Experiment 3 of DOS No. 3,324,287 in the presence of triethylbenzylammonium chloride was dissolved in 385 g of isobutanol and hydrogenated as described in Example 4, thus obtaining a resin having a softening point of 117° C. (oxygen content: 7.6% by weight), perfectly soluble in n-hexane, mineral spirits, petroleum ether, and ethanol.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A naphtha-soluble, hydrogenated $C_{1-4}$alkyl $C_{6-10}$-aryl ketone/formaldehyde resin, having an oxygen content of at least 6% by weight and a softening point of at least 70° C.

2. A resin according to claim 1, having an oxygen content of 7-9.5% by weight.

3. A resin according to claim 1, having a softening point of 75°-135° C.

4. A resin according to claim 3, wherein said softening point is 85°-125° C.

5. A resin according to claim 1, having a solubility of at least about 50 g/l in n-hexane.

6. A resin according to claim 5, wherein said solubility is at least 300 g/l.

7. A resin according to claim 6, wherein said solubility is at least 600 g/l.

8. A varnish or enamel comprising the resin of claim 1.

* * * * *